(12) United States Patent
Brown et al.

(10) Patent No.: US 11,923,732 B2
(45) Date of Patent: Mar. 5, 2024

(54) MAGNETIC ROTOR UNIT, AND APPARATUS AND METHOD OF MANUFACTURING A MAGNETIC ROTOR UNIT

(71) Applicant: SG Technologies Limited, Rainham (GB)

(72) Inventors: David Brown, Hornchurch (GB); Matthew Magee, Hornchurch (GB); Jon Swift, London (GB); Steven Roome, Leigh on Sea (GB); John Taylor, Radlett (GB)

(73) Assignee: SG Technologies Limited, Rainham (GB)

( * ) Notice: Subject to any disclaimer, the term of this patent is extended or adjusted under 35 U.S.C. 154(b) by 0 days.

(21) Appl. No.: 17/423,032

(22) PCT Filed: Jan. 13, 2020

(86) PCT No.: PCT/EP2020/050670
§ 371 (c)(1),
(2) Date: Jul. 14, 2021

(87) PCT Pub. No.: WO2020/148223
PCT Pub. Date: Jul. 23, 2020

(65) Prior Publication Data
US 2022/0123631 A1    Apr. 21, 2022

(30) Foreign Application Priority Data
Jan. 14, 2019   (GB) ..................... 1900491

(51) Int. Cl.
*B29C 65/32*   (2006.01)
*B29C 65/00*   (2006.01)
(Continued)

(52) U.S. Cl.
CPC ............ *H02K 15/03* (2013.01); *B29C 65/32* (2013.01); *B29C 65/46* (2013.01);
(Continued)

(58) Field of Classification Search
CPC ........ H02K 15/03; B29C 65/32; B29C 65/46; B29C 66/7394; B29C 66/742; B29K 2995/0008; B29L 2031/7498
See application file for complete search history.

(56) References Cited

U.S. PATENT DOCUMENTS

| 3,986,253 A | 10/1976 | Harris |
| 5,932,134 A | 8/1999 | Christ et al. |

(Continued)

FOREIGN PATENT DOCUMENTS

| CN | 1246217 A | * 3/2000 | ........... H02K 1/2726 |
| GB | 2563615 A | 10/1976 | |

(Continued)

OTHER PUBLICATIONS

International Search Report and Written Opinion for International Application No. PCT/EP2020/050670, dated Mar. 20, 2020.
(Continued)

*Primary Examiner* — Daniel Mcnally
(74) *Attorney, Agent, or Firm* — Wolf, Greenfield & Sacks, P.C.

(57) ABSTRACT

The method of manufacturing a magnetic rotor unit comprises providing a composite magnetic rotor body. The composite magnetic rotor body comprises magnetic particles dispersed in a polymer resin. The composite magnetic rotor body has a hole. The method further comprises inserting a shaft into the hole. The outer diameter of the shaft corresponds to the inner diameter of the hole. The method further comprises heating of the shaft. By heating the shaft, the elevated temperature of the shaft surface preferentially (Continued)

induces the polymer resin from an inner surface of the hole to exude or sweat on to the shaft surface, so as to provide a bonding layer between the magnetic rotor body and the shaft. An apparatus for such manufacture, and a magnetic rotor unit manufactured by such method, are also provided. Such rotor units have wide application, and may for example be used in sensors, electromagnetic generators, pulse generators, motors, magnetic brakes and magnetic couplings.

21 Claims, 8 Drawing Sheets

(51) Int. Cl.
    *B29C 65/46*     (2006.01)
    *H02K 15/03*     (2006.01)
    *B29L 31/00*     (2006.01)

(52) U.S. Cl.
    CPC ........ *B29C 66/7394* (2013.01); *B29C 66/742* (2013.01); *B29K 2995/0008* (2013.01); *B29L 2031/7498* (2013.01)

(56) References Cited

U.S. PATENT DOCUMENTS

| | | |
|---|---|---|
| 2001/0009339 A1 | 7/2001 | Wiesler et al. |
| 2005/0155702 A1* | 7/2005 | Ganz .................. B29C 66/742 |
| | | 156/272.4 |
| 2017/0145260 A1* | 5/2017 | Engeldinger ............ C09J 11/04 |

FOREIGN PATENT DOCUMENTS

| | | | | |
|---|---|---|---|---|
| GB | 2563615 A | * | 12/2018 | ............... H02K 1/04 |
| JP | 2002-335655 A | | 11/2002 | |
| JP | 2003-189560 A | | 4/2003 | |
| JP | 2003189560 A | * | 7/2003 | |
| JP | 2006-81360 A | | 3/2006 | |
| JP | 2016-167397 A | | 9/2016 | |

OTHER PUBLICATIONS

International Preliminary Report on Patentability for International Application No. PCT/EP2020/050670, dated Jul. 29, 2021.
Combined Search and Examination Report for British Application No. 1900491.0, dated Jul. 12, 2019.

* cited by examiner

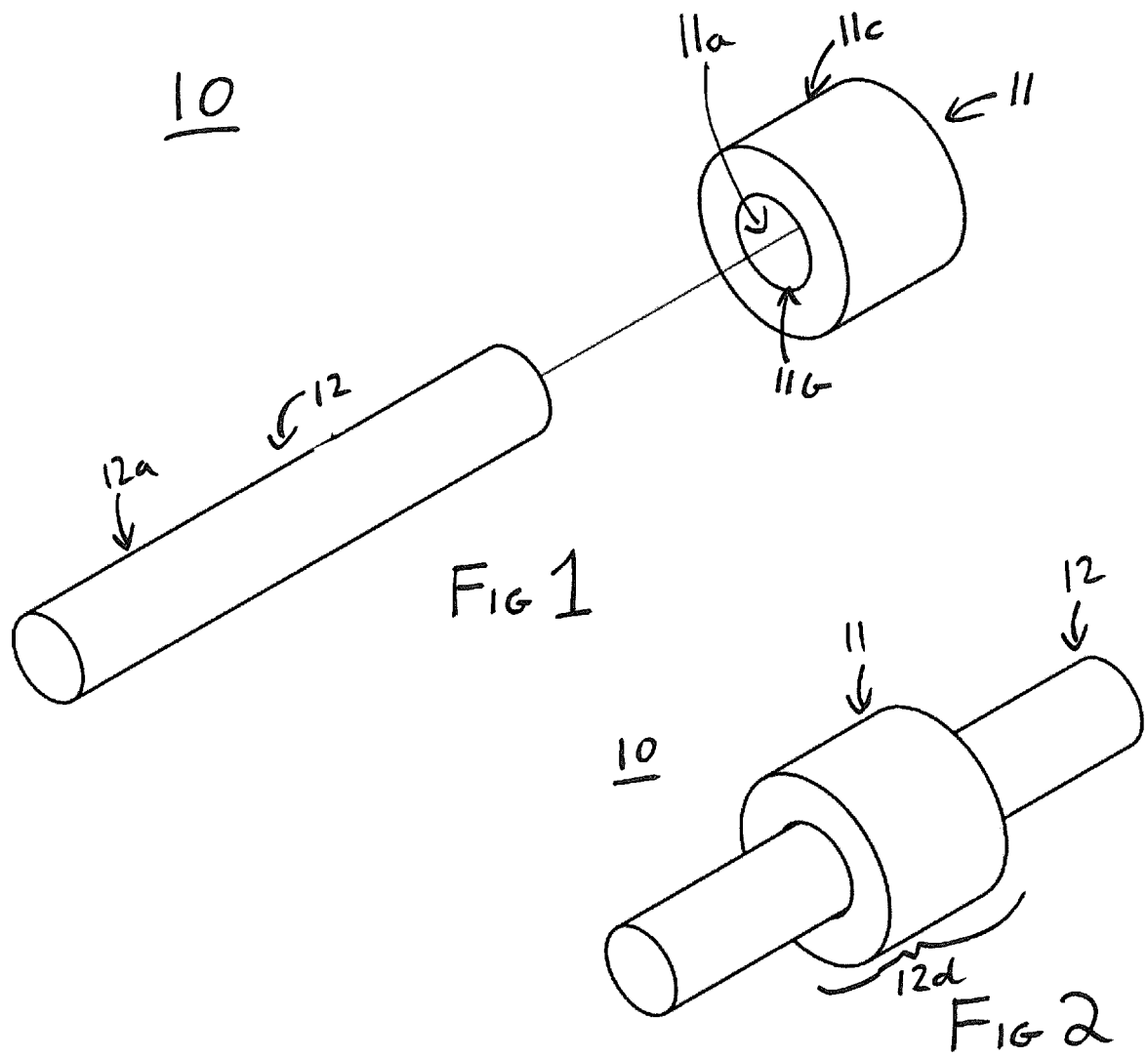

MAGNETIC ROTOR UNIT, AND APPARATUS AND METHOD OF MANUFACTURING A MAGNETIC ROTOR UNIT

This Application is a national stage filing under 35 U.S.C. § 371 of International Patent Application Serial No. PCT/EP2020/050670, filed Jan. 13, 2020, which claims priority to British application number 1900491.0, filed Jan. 14, 2019. The entire contents of these applications are incorporated herein by reference in their entirety.

FIELD OF THE INVENTION

The present invention relates to a method of manufacturing a magnetic rotor unit, and particularly to one in which a magnetic motor body comprising magnetic particles dispersed in a polymer resin is assembled to a shaft. The present invention also provides an apparatus for manufacturing the magnetic rotor unit and a magnetic rotor unit manufactured by the method.

BACKGROUND

A magnetic rotor unit comprises a magnetic rotor body which is or can be appropriately magnetised to provide a set of magnetic poles assembled to a shaft. The magnetic body may thereby be rotated, either by torque applied by the shaft to establish a rotating magnetic field, or by electromagnetic torque applied to the magnetic body to drive rotation of the shaft. Such rotor units have wide application, and may for example be used in sensors, electromagnetic generators, pulse generators, motors, magnetic brakes and magnetic couplings.

It is desirable for such applications that the magnetic rotor unit provide a high degree of symmetry, both in terms of the centring of the magnetic rotor body on an axis of the shaft and in terms of the provision of a smooth and well-defined external surface of the magnetic rotor body. The former avoids undesirable forces and consequent vibrations in operation; the latter allows the clearance to between the rotor body and adjacent components to be reduced to a minimum, leading to improved compactness and electromagnetic efficiency.

Conventionally, it has been typical to provide a magnetic rotor body in the form of a cylinder with an axial bore, to arrange the cylinder on the shaft by passing the shaft, correspondingly dimensioned to fit the bore, into the bore, and providing glue between the rotor body and the shaft, for example by spraying, injection or capillary action.

This conventional process has a number of disadvantages. In particular, the need to introduce a sufficiently thin, uniform layer of glue between the shaft and the bore of the rotor body typically requires greater clearances to be provided between the shaft and the bore than may be desirable. This can affect the overall symmetry of the assembled unit. Moreover, residual glue can exist at portions of the shaft and rotor body outside of the bore, leading to reduction in available tolerance and balance.

It is therefore desirable to provide an improved method of securing a magnetic rotor body to a shaft to form a magnetic rotor unit.

These and other advantages are provided by the embodiments of the present invention.

SUMMARY OF INVENTION

According to a first aspect of the present invention, there is provided a method of manufacturing a magnetic rotor unit. The method of manufacturing a magnetic rotor unit comprises providing a composite magnetic rotor body. The composite magnetic rotor body comprises magnetic particles dispersed in a polymer resin. The composite magnetic rotor body has a hole formed therein. The method further comprises inserting a shaft into this hole. The outer diameter of the shaft corresponds to the inner diameter of the hole. The method further comprises heating the shaft.

By applying the first aspect of the present invention, and in particular by heating the shaft, the elevated temperature of the shaft selectively induces exuding or sweating of the polymer resin from the inner surface of the hole, so as to provide a bonding layer between the magnetic rotor body and the shaft. Such an approach allows the use of very small tolerances between the outer diameter of the shaft and the inner diameter of the hole.

By applying the first aspect of the present invention, the remainder of the rotor body, which is relatively farther from the shaft than the inner surface of the hole, also receives less heat from the shaft, reaches a relatively lower temperature, and therefore does not exhibit sweating or exuding of polymer resin to such a degree. Such sweating or exuding of polymer resin at outer surfaces of the rotor body can increase surface roughness, thereby leading to a poor surface finish and a reduced ability to bring other components close to the rotor body. This leads to a reduction in efficiency and compactness of the device in which the rotor is to be incorporated. Accordingly, by applying the first aspect of the present invention, an acceptable surface finish can be provided at parts of the rotor body distant from the shaft.

Moreover, since the temperature of the inner surface of the hole, from which the polymer resin is to sweat or exude, is not constrained by the requirement to minimise sweating or exuding at other surfaces of the rotor body so as to achieve an acceptable surface finish, the inner surface can, by means of heating of the shaft to an appropriate temperature, be brought to a high temperature rapidly. This allows a high degree of liquefaction of the resin at the inner surface to be achieved rapidly. This allows a relatively large quantity of the polymer resin rapidly to exude or sweat onto the shaft. The large quantity of resin exuded and the high degree of liquefaction can provide extensive wetting of the resin to the shaft surface along the length of the hole, thereby allowing a bonding layer of resin to be achieved between the magnetic rotor body and the shaft reliably under a wide variety of conditions.

The composite magnetic rotor body can be formed from a powder comprising magnetic particles dispersed in a polymer resin.

In a particular embodiment of the present invention, the heating is performed in a relatively cool environment so as to reduce a temperature gradient across the rotor body radially outward of the shaft. Performing the heating in a relatively cool environment inhibits the rise in temperature at the external surfaces of the rotor body which are not adjacent the shaft, in other words which are not the inner diameter surface, thereby further allowing the surface finish of the rotor body to remain unaffected. The relatively cool environment may be an ambient temperature environment.

In a particular embodiment of the present invention, the heating of the shaft comprises causing a current to flow in the shaft. Causing a current to flow in the shaft allows the heating of the shaft to be performed by resistive (Ohmic) heating. This allows a more uniform heating of the shaft along its length so that the exuding or sweating effect and consequently the bonding between the rotor body and the shaft is more uniform and thus more secure.

In a particular embodiment of the present invention, the current is alternating current. An alternating current passing in a shaft is preferentially confined within the shaft to a region adjacent the surface of the shaft, between the outer surface and the level termed the skin depth. This causes the effective resistance of the shaft to increase by reducing the effective cross section of the shaft, and moreover ensures that the resistive heating of the shaft occurs preferentially close to the surface of the shaft. This reduces the tendency of the shaft to heat in bulk, and thus allows greater temperatures to be achieved at the surface of the shaft, in order to promote rapid to sweating or exuding of the resin, while avoiding detrimental effects to the metallurgical properties of the shaft by processes such as annealing or other heat treatment process which may be caused by elevating the bulk of the shaft to a desired temperature.

In a particular embodiment of the present invention, the current is caused to flow by electromagnetic induction. Causing the current to flow by electromagnetic induction provides a number of further advantages. By causing the current to flow by electromagnetic induction, the coupling to the magnetic material in the rotor body preferentially localises the effect of the heating to those regions of the shaft which are proximate the inner diameter surface, thereby further localising the heating effect. Moreover, generating the current by induction provides a safe and convenient method of heating the shaft which is suitable for mass production. Generating the current in this way avoids the need, for example, to clamp contacts to the ends of the shaft, and also avoids disadvantages associated with electrical arcing and the like.

In a particular embodiment of the invention, the current is caused to flow by placing at least a portion of the shaft, which is inserted in to the hole of the magnetic rotor body, within and in a state of at least partial axial alignment with an induction coil. The current is further caused to flow by causing an alternating current to flow in the induction coil. By placing a portion of the shaft which is inserted in to the hole within and in a state of at least partial axial alignment with an induction coil, good coupling is achieved between the induction coil and the material of the shaft, thereby providing increased efficiency, rapidity of heating, and control and repeatability of the process.

In a particular embodiment of the present invention, the hole is a through-hole. Providing the hole as a through-hole maximises the length of the rotor body available for bonding to the shaft, and provides an overall more stable rotor assembly which can be supported at both or either end of the shaft, and to which one or more additional rotating assemblies can be provided.

In a particular embodiment of the present invention, the clearance between the shaft and the magnet rotor body inner diameter is less than 200 micrometres, optionally less than 100 micrometres, further optionally less than 50 micrometres. Providing such a clearance between the shaft and the inner surface of the hole improves the ability of the exuded resin to fill the gap between the shaft and the inner diameter, thereby leading to improved bond integrity and hence bond strength between the shaft and the rotor body. Moreover, providing such a clearance improves the symmetry of the overall assembly.

In a particular embodiment of the present invention, the shaft is made of a metallic material, optionally a metal. Here, a metallic material includes metal alloys as well as elemental metals and metalloids and semiconductors. Providing a metallic shaft is particularly advantageous for allowing a desired elevated temperature to be achieved at the surface of the shaft through the direct application of heat or through the flow of current.

In a particular embodiment of the invention, the rotor body has rotational symmetry about an axis, and the shaft is aligned with the axis of rotational symmetry. Preferably, the rotational symmetry is cylindrical symmetry. Providing a rotor body with rotational symmetry, and particularly a high degree of rotational symmetry, and aligning the shaft with the axis of rotational symmetry, enables a reduction in vibration of the rotor when rotated at high speed and permits other elements such as sense elements to be brought closer to the rotor than would otherwise be possible. Thereby, it is possible to improve the reliability, electromagnetic efficiency and compactness of the device in which the rotor is incorporated.

In a particular embodiment of the present invention, the rotor body is cylindrical. Such a rotor body is preferable in terms of compactness and in terms of vibrational stability.

In a particular embodiment of the present invention, the shaft is cylindrical. Such is advantageous in terms of manufacture, assembly and stability.

In a particular embodiment of the invention, the inner diameter is cylindrical. Such is also advantageous in terms of manufacture, assembly, and stability.

In a particular embodiment of the present invention, the magnetic particles comprise at least one of, or a combination of, ferrite, rare-earth iron boride, or samarium iron nitride. Ferrite, rare earth iron boride and samarium iron nitride are effective permanent magnetic materials for forming the magnetic elements of the rotor body and for securely embedding in a polymer matrix. The ferrite may be Sr-ferrite, Ba-ferrite, or $Fe_2O_3$, for example. The rare earth iron boride may be neodymium iron boride, in particular a melt spun alloy including the $(Nd,Pr)_2Fe_{14}B$ phase, for example.

In a particular embodiment of the present invention, the resin comprises epoxy resin. Epoxy resin is advantageous in embodiments of the invention since it can be liquefied by elevation to a high temperature for short periods of time, but can be cured by cross-linking into a strong solid state by elevation to relatively lower temperatures for a longer period of time. Therefore, it is possible to achieve both good bonding between the rotor body and the shaft and a high mechanical stability of the rotor body.

In a particular embodiment of the present invention, the rotor body is a compacted composite body. If the rotor body is a compacted composite, it may have reduced void content. Accordingly, there is a greater propensity for the resin to exude or sweat out of the magnet rotor at elevated temperature by the forcing effect of the relative expansion of the resin as it goes from the solid to the liquid state.

In a particular embodiment of the present invention, the heating is such that a surface of the shaft adjacent to the inner surface of the hole reaches a temperature corresponding to a temperature at which the polymer resin exudes from the magnet rotor body to contact the outer surface of the shaft, thereby to form a bonding layer of resin. The temperature is preferably equal to or greater than a liquefaction temperature of the resin. Under such a process, it can be ensured that a strong bond between rotor body and shaft may be achieved.

In a particular embodiment of the present invention, the heating is such as to cause the outer surface of the shaft to heat at a faster rate than a radially inner portion of the shaft. Accordingly, the outer surface of the shaft reaches a higher temperature than the centre of the shaft, and it is possible to avoid or reduce degradation of metallurgical, mechanical or physical properties of the shaft.

In a particular embodiment of the particular embodiment, the rotor body is a green body comprising uncured resin. By providing the rotor body as a green body comprising uncured resin, it can be assured that the resin will sweat or exude to form the bond between the rotor body and the shaft while allowing a post-processing of the assembled rotor unit by curing to achieve an overall strong and mechanically stable assembly.

In a further embodiment of the present invention, the method comprises a step of, after heating the shaft, cooling the shaft. The shaft may be cooled actively by the application of a cooling medium or element, or may be cooled passively by heat exchange with the relatively cooler environment. By cooling the shaft after heating the shaft, or allowing the shaft to cool after the shaft is heated, the temperature of the shaft does not remain at the elevated temperature and the extent of exudation or sweating of the epoxy can be controlled to a relatively thin layer adjacent the inner surface of the hole. Moreover, inadvertent partial or curing of the resin throughout the rotor body, or at least in a region adjacent the shaft, can be avoided or inhibited. Therefore, better control of the overall manufacturing process, and therefore the integrity between the bond and the rotor body and the shaft and the internal overall mechanical properties of the rotor body, can be assured.

In a particular embodiment of the present invention, the method comprises a step of, after heating the shaft, curing the resin of the rotor body by heating the rotor body to a curing temperature for at least a curing time period so as to thermally cure the resin. Such thermal cure can, for example, be attained by inducing a cross-linking reaction in the resin. By curing the resin of the rotor body in such a process after the shaft is heated, both the internal mechanical properties of the rotor body are assured, and moreover the exuded or sweated resin layer between the shaft and the rotor body is integrated into the overall structure by the curing process, thereby leading to even greater of bond between the shaft and magnet rotor.

In a particular embodiment of the present invention, the resin loading of the rotor body is greater than 1% by weight. By providing such a resin loading, it can be assured that exuding or sweating of the resin is promoted to an extent suitable to obtain a suitably secure bond between the rotor body and the shaft. In such an embodiment, the resin loading is optionally less than 5% by weight of the rotor body. Resin loading above 5% by weight is associated with poorer mechanical and magnetic performance. Further improved performance is associated a resin loading between 1 weight percent and 3 weight percent.

According to a second aspect of the present invention, there is provided an apparatus for manufacturing a magnetic rotor unit. The apparatus comprises a first holding part. The first holding part is for holding a composite magnetic rotor body. The magnetic rotor body comprises magnetic particles. The magnetic particles are dispersed in a polymer resin. The magnetic rotor body is formed with a hole therein. The apparatus further comprises a second holding part. The second holding part is for holding a conductive shaft. The conductive shaft has an outer diameter corresponding to the inner diameter of the hole. The apparatus further comprises a moveable part. The moveable part is arranged to move the first holding part relative to the second holding part. The motion of the first holding part relative to the second holding part is so as to insert the conductive holding part in to the hole of the rotor body. The apparatus further comprises a heating unit. The heating unit is arranged to heat the shaft in a state that the shaft is inserted into the rotor body. The apparatus of the second aspect of the present invention is particularly convenient for implementing the method according to the first aspect in a repeatable way.

In a particular embodiment of the present invention, the heating unit comprises an induction coil arranged to surround at least a portion of the shaft which is inserted into the hole in a state of at least partial axial alignment with the induction coil. The apparatus further comprises a power supply arranged to cause a current to flow in the induction coil. In such an embodiment, the heating of the shaft can be achieved in a particularly repeatable, safe and convenient way.

According to a third aspect of the present invention, there is provided a magnetic rotor unit manufactured by the process of the first aspect in any of its embodiments. Such a magnetic rotor unit may exhibit a satisfactory bond strength between magnetic rotor body and shaft and may provide improved symmetry and outer surface finish.

These and other advantages of the present invention will be appreciated by reference to the following detailed description of exemplary embodiments of the invention.

BRIEF DESCRIPTION OF THE DRAWINGS

FIG. 1 shows an exploded diagram of a magnetic rotor unit.

FIG. 2 is a diagram of magnetic rotor unit in an assembled state.

DETAILED DESCRIPTION

There follows a detailed description of one or more embodiments of the present invention. However, these embodiments are intended as explanatory only to assist the reader for appreciating how the same may be put into effect, and should not be understood as limiting on the scope of the invention hereby claimed.

FIG. 1 shows an exploded view of a magnetic rotor unit (10), comprising a magnetic rotor body (11) and a shaft (12).

Figure 10:
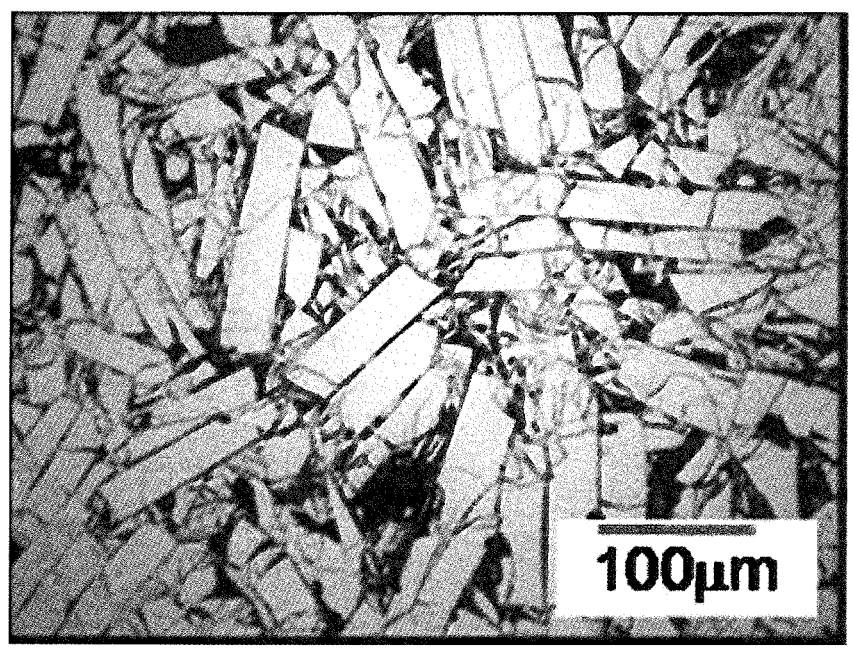
FIG. 10 shows a micrograph showing microstructure of a magnetic rotor body usable in implementing the present invention.

Magnetic rotor body (11) is manufactured as a composite magnetic rotor body comprising magnetic particles dispersed in a polymer resin matrix. A micrograph of such a composite is shown in FIG. 10, in which flakes of magnetic material can clearly be seen embedded in a resin matrix (melt spun Nd—Fe—B flakes in this particular case). Such composites are well known in the art of manufacturing magnetic rotor bodies, and the mechanical and magnetic properties of such bodies can be varied by changing the material and particle size and form of the magnetic particles and by changing the relative amount and composition of the polymer resin.

In the example of FIG. 10, the magnetic flakes are 20 to 50 micrometres thick, and 50 to 200 micrometres in length, surrounded by both resin and voids. The void amount can be reduced by the degree of compaction of the composite, for example by pressing in a press, to form a compressed magnetic composite.

The polymer used is not particularly limited, but in particular it is noted that the invention can be implemented with substantially all thermosetting polymers, and specifically the epoxy resin family. For example, epoxy resins such as bisphenol a, bisphenol f, novolac, cycloaliphatic and glycidylamine can be used. One example of an epoxy resin which may be used to implement the invention is epichlorohyrdrin-cresol novolac epoxy. Another example of epoxy resin suitable for implementing the invention is poly(bisphenol a-co-epichlorohydrin)glyceryl. The resin can comprise additives such as hardeners and accelerators. In particular embodiments of the invention, the resin represents between 1 weight percent and 5 weight percent of the magnetic rotor body.

The magnetic particles used are also not particularly limited. The invention can be implemented with substantially all permanent magnetic powders. For example, melt spun flakes of rare earth iron boride powder, spherical particles of atomised rare earth iron boride powder, spherical particles of crushed rare earth iron boride powder, spherical particles of ferrite powder (Ba-ferrite and Sr-ferrite, or $Fe_2O_3$, for example), melt spun flakes of Sm—Fe—N powder and spherical particles of crushed Sm—Fe—N powder can be implemented. Such particles and flakes may have dimensions of approximately 30 micrometres to 150 micrometres.

One representative embodiment of the invention may be implemented with MQP-B flake available from Magnequench. This flake is an Nd—Fe—B flake supplied as a −80 mesh powder. The flake is in this representative embodiment combined with either a bisophenol A or novolac type epoxy resin, respectively). Such resins may be obtained, for example, from Hexion, Nan Ya Plastics Corporation, CCP and Dow.

In the present embodiment, the magnetic rotor body (11) is a green body, in that the resin binding the magnetic particles is uncured. Such a green body can be cured by elevating the body to a suitable temperature for a suitable amount of time so that the resin cures. For example, elevation to 150-220° C. for 1-10 hours are conventional oven curing conditions. In the case of an epoxy resin, this allows cross-links to form between the polymer chains, forming a mechanically stable composite.

In the present embodiment, the magnetic rotor body (11) is generally cylindrical in form, with a cylindrical hole (11A), herein also referred to as a bore, formed to extend through it. The magnetic rotor body (11) thus has a cylindrical outer surface (11C) and a cylindrical inner surface (11B). In the configuration of FIG. 1, the axes of these cylinders are aligned; that is to say, the cylinders are coaxial.

Shaft (12) is also cylindrical in form, longer in an axial direction than the axial length of bore (11A) of magnetic rotor body (11), and also has a cylindrical outer surface (12A).

Figure 3:
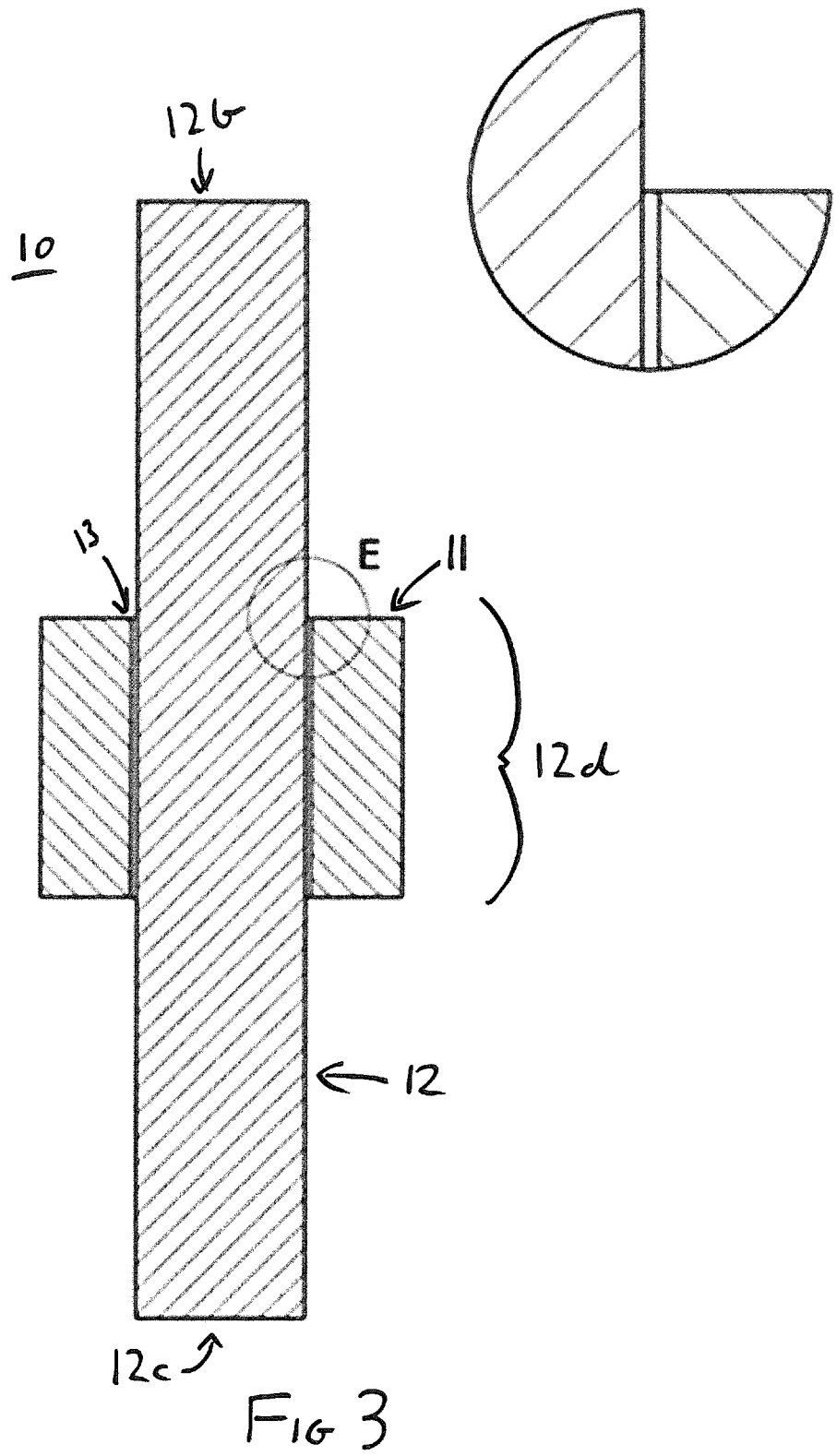
FIG. 3 is a cross-section of the magnetic rotor unit shown in FIG. 5.

The outer diameter of shaft (12), that is, the diameter of outer surface (12A), corresponds to the inner diameter of bore (11A), that is the inner diameter of inner surface (11B). By these surfaces corresponding, it is understood that these surfaces have essentially the same or similar dimensions, with a slight clearance between the two, thereby to allow the shaft (12) to be inserted into magnetic rotor body (11) and to slide there along, without significant lateral movement and without undue friction. Therefore, there is a minute gap between shaft (12) and magnetic rotor body (11) when shaft (12) is inserted into bore (11A). This slight clearance is shown as clearance (13) in FIG. 3, which is a cross-section of the assembly shown in FIG. 2.

In the present embodiment, the clearance is less than 200 micrometres, preferably less than 100 micrometres on each side of the shaft, further preferably less than 50 micrometres on each side of the shaft. Clearances of less than 30 micrometres or less than 20 micrometres are achievable by applying the present invention.

In the present embodiment, shaft (12) is electrically conductive. For example, shaft (12) is steel. However, shaft (12) could be another conductive material, such as a metallic material. Here, a metallic material includes metal alloys as well as elemental metals and metalloids and semiconductors such as graphite and silicon. A metal or other metallic material is advantageous for forming shaft (12), as metallic materials typically have good thermal and electrical conductivity, and therefore are particularly suitable for use in the inventive methods herein disclosed. Moreover, metals, and particularly steel, aluminium and brass, have mechanical properties desirable in forming a rotor shaft.

FIG. 2 shows the result of introducing shaft (12) into magnetic rotor body (11) to form magnetic rotor unit (10), in which it can be seen that magnetic rotor body (11) surrounds a central portion (12a) of shaft (12). Depending on the tolerances adopted, the sliding of magnetic rotor (11) on shaft (12) may require a greater or lesser force. In the present embodiment, it is assumed that the clearances selected are sufficient for magnetic rotor (11) is able to slide relatively easily on shaft (12).

Even if a friction fit were adopted between shaft (12) and magnetic rotor body (11) such that magnetic rotor (11) were unable to slide easily, magnetic rotor unit shown in FIG. 2 would be unable effectively to transfer high torque loads between the shaft (12) and the rotor body (11), as the rotor body remains able to slip on the shaft. Moreover, such a configuration would not be mechanically stable over time. It is therefore appropriate to provide some form of bonding therefore between magnetic rotor body (11) and shaft (12).

In the present embodiment, this bonding is provided by means of a thin layer (14) of the resin which is present between inner surface (11B) of rotor body (11) and the outer surface (12A) of shaft (12) and which acts as a bonding layer. To provide resin layer (14), according to the present embodiment, shaft (12) is heated.

Heating of shaft (12) causes an elevated temperature to be reached in the central portion (12D) of the shaft. Accordingly, heat from the shaft will heat the inner surface (11B) of magnetic rotor body (11). When heated to a sufficiently high temperature, for example to a temperature close to or exceeding that which the resin incorporated in magnetic rotor body (11) will melt, then the resin close to inner surface (11B) will tend to sweat or exude into the clearance between the shaft (12) outer surface (12A) and the inner surface (11B) of magnetic rotor body (11), thereby to form a resin layer (14) as a bonding layer between the outer surface (12A) of shaft (12) and the inner surface (11B) of rotor body (11).

Such sweating or exuding is enhanced if the magnetic rotor body is compacted to attain a high density, since the reduced presence of internal voids in such a compacted composite body encourages the resin to expand out of the inner surface (11B) of rotor body (11)

Figure 4:
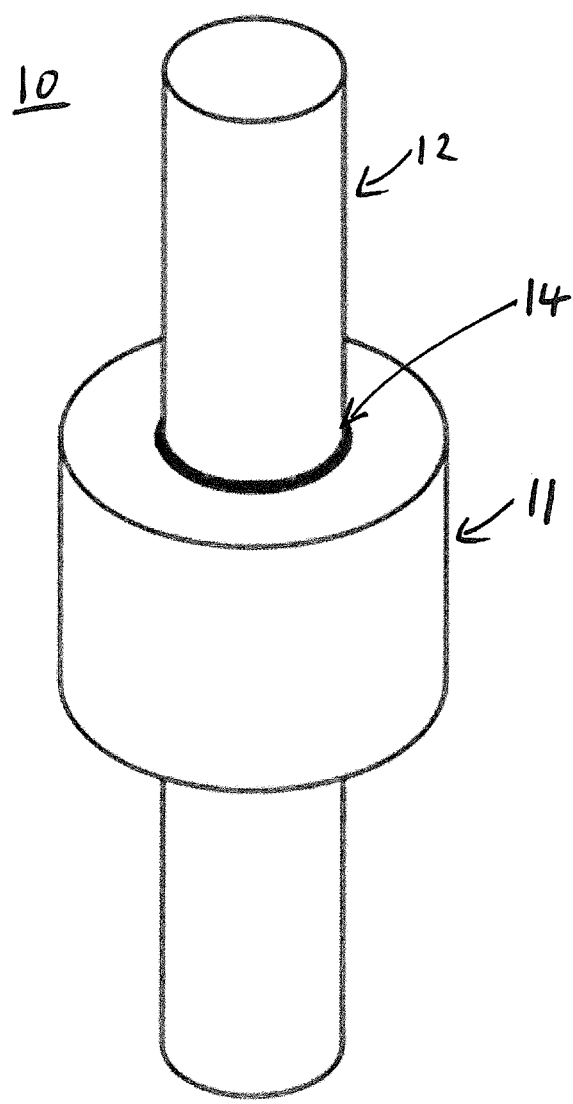
FIG. 4 is a diagram explaining the bond interface between the magnetic rotor body and the shaft of the magnetic rotor unit in an embodiment of the present invention.
Figure 5:
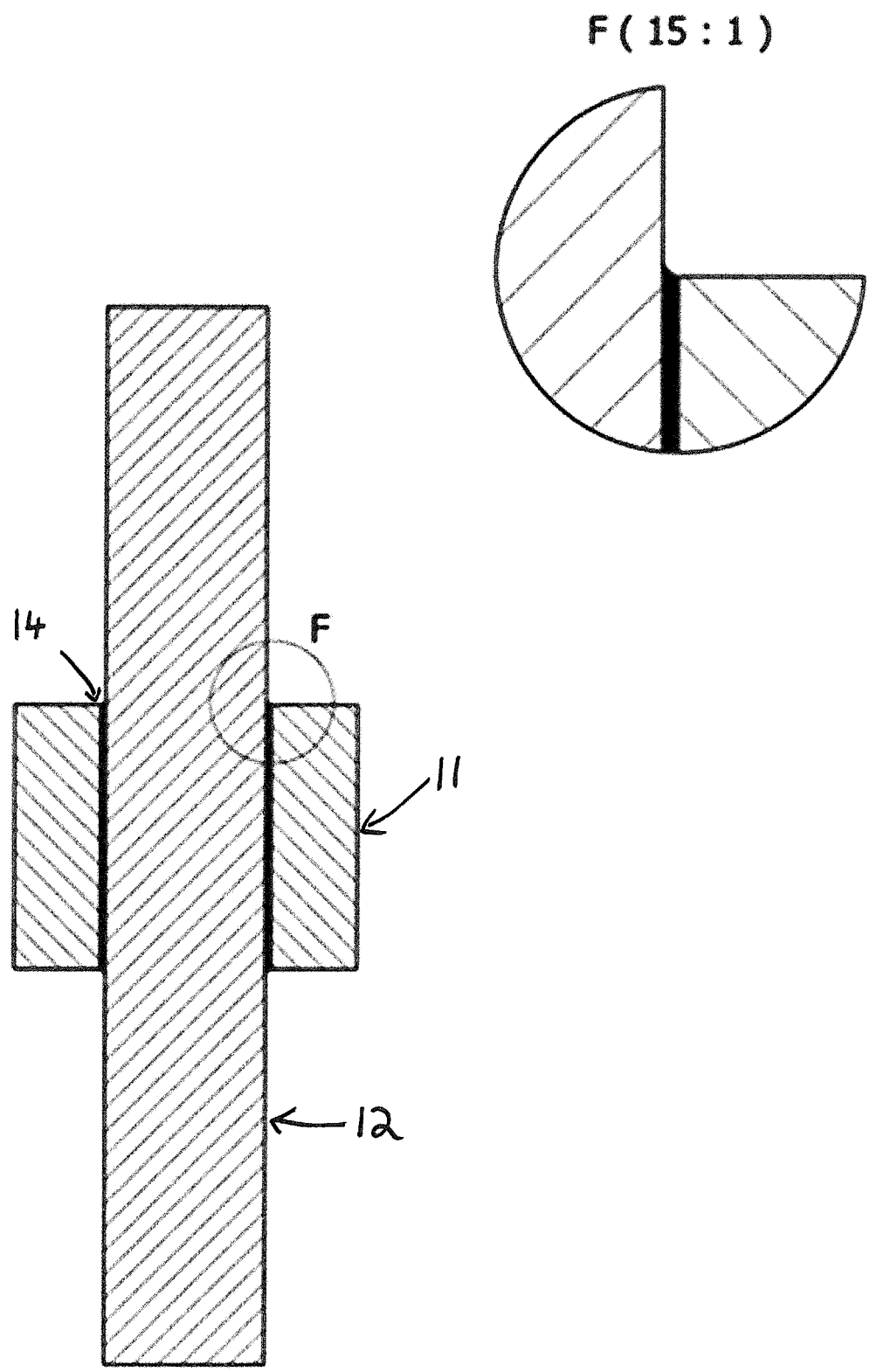
FIG. 5 is a cross-section of the magnetic rotor unit shown in FIG. 4.

The effect of this heating process in providing the resin layer can be observed as liquid resin appearing at the inner diameter interface corresponding to resin layer (14) in FIGS. 4 and 5. As compared with a situation in which glue is used to attach a rotor body to a shaft, the bonding layer formed by the resin is more uniform, a smaller clearance between shaft and rotor body is possible, and there is a reduced possibility for residue to exist on the exposed outer surface (12A) of shaft (12) or on the end faces (11E and 11F) of rotor body (11). Therefore, the result is a component with greater symmetry and improved surface finish than available using prior methods.

Moreover, since inner surface (11B) of rotor body (11) receives heat from shaft (12), the temperature of portions of rotor body (11) at distances away from inner surface (11B) are subject to a progressively reduced rise in temperature with distance, in other words a thermal gradient may be established between the outer surface (12A) of shaft (12) and the bulk of rotor body (11). For example, the ambient conditions of the space in which the heating process is performed may provide a relatively cool environment than the temperature attained at the outer surface (12A) of shaft (12). Hence, it is possible to ensure that outer surface (11C) of rotor body (11) remains cool, or at least cooler than the inner surface (11B). Therefore, it can be reduced or avoided that sweating or exuding of resin from other surfaces such as end surfaces (11E and 11F) and outer surface (11C) of rotor body (11) occurs. This avoids the creation of surface roughness at these surfaces and allows acceptable clearances to be maintained between the rotor body and surrounding components.

The magnetic rotor body assembled to the shaft can then be cured in a conventional manner, for example by the elevation of temperature over a suitable period of time, leading to the resin to fully cross-link and enhance the bond between the rotor body and the shaft. By adopting an appropriately low curing temperature such that liquefaction of the resin does not occur during curing, it can be avoided that the bulk of the resin of the rotor body (11) exudes or sweats from the external surfaces of the rotor body (11). This also avoids the creation of surface roughness and allows acceptable clearances to be maintained between the rotor body and surrounding components.

Heating of shaft (12) may be achieved, for example by bringing opposite axial ends (12B, 12C) of shaft (12) in to thermal contact with a heat source, and allowing the conduction of the heat along the shaft (12) to elevate the shaft to a substantially uniform temperature. When heating the shaft, it is preferable to establish a relatively uniform temperature by heating from both axial ends (12B and 12C), although it would also be possible also to provide a non-uniform temperature distribution axially along the shaft by heating end (12B) and not (12C), or vice versa.

In another embodiment of the present invention, the heating of shaft (12) can be caused by passing an electric current along the shaft, for example by electrodes clamped to axial ends (12B, 12C) of shaft (12). Passing a sufficiently high current, for example a direct current, along shaft (12) from one axial end to the other can provide a sufficient degree of resistive (Ohmic) heating in shaft (12) so as to provide a suitably elevated temperature adjacent inner surface (11B) of rotor body (11) to cause the exudation or sweating of the resin and thereby provide resin layer (14) as the bonding layer. The temperature to be achieved may be controlled depending on, for example, the current applied and the length of time for which the current is applied.

In a further embodiment, the current may be alternating current. Unlike direct current, which flows essentially uniformly through the cross-section of a conductor, alternating current tends to be localised within a skin depth delta adjacent to the outer surface of the conductor. This tends to reduce the effective cross-section of the conductor available for conducting current, leading to an increase in resistance and thereby an increase in energy deposited in the conductor through resistive (Ohmic) heating. This also tends to localise the resistive (Ohmic) heating to a region corresponding to the skin depth. For a round wire, the general formula of skin depth is given by:

$$\delta = \sqrt{(2\rho/\omega\mu)}$$

where rho is the resistivity of the conductor, omega is the angular frequency of the current in the conductor, and mu is the permeability of the conductor.

By localising the heating to a region corresponding to the skin depth, it is possible to rapidly heat the surface of the shaft to a desired temperature, sufficient to heat the inner surface of the rotor body, without heating the bulk of the shaft to such a high temperature. This rapid and localised heating can avoid thermal effects in the bulk of the shaft including physical effects such as thermal expansion, metallurgical effects such as annealing, and mechanical effects such as softening and deformation.

Accordingly, by adopting a suitably high frequency for the current applied, for example a frequency between 50 kiloHertz and 100 kiloHertz, an appropriate localisation of current can be particularly assured. However, in practice, for example, frequencies between 1 Hertz and 1 megaHertz may be adopted as appropriate, depending on the dimensions of the shaft.

A particularly advantageous method of heating the shaft may be achieved by the application of electromagnetic induction to induce a current in the shaft. Here, the current may not be along the shaft, but rather may be around its circumference, and may exist in the form of eddy currents. To induce a current in the shaft by the application of electromagnetic induction, the shaft may be arranged within a coil through which a current, preferably an alternating current, is passed. Provided that the axis shaft is at least partially aligned with the axis of the coil, eddy currents may be induced which circulate around the circumference of the shaft. Coil powers between 1 kiloWatt and 10 kiloWatt applied for 0.5 to 5 seconds may be appropriate, but the power can be adapted based on the materials and the geometry in a straightforward way without undue experimentation.

Inducing a current in the shaft avoids the need to make direct electrical contact with the shaft, and moreover does not require high positional accuracy of the shaft with respect to other elements of processing apparatus such as electrical contacts. Therefore it is particularly convenient in use of large-scale production of magnetic rotor units in a safe, repeatable and convenient manner.

In some configurations in which electromagnetic induction is used to heat the shaft, a ceramic shaft may be used instead of a metal or metallic shaft. In such a configuration, heat may be generated by inducting the metallic components within the magnetic rotor body due to hysteresis heating. However, the use of a metal or metallic shaft is preferable in terms of being able to achieve higher temperatures and better control of the heating process.

Figure 6:
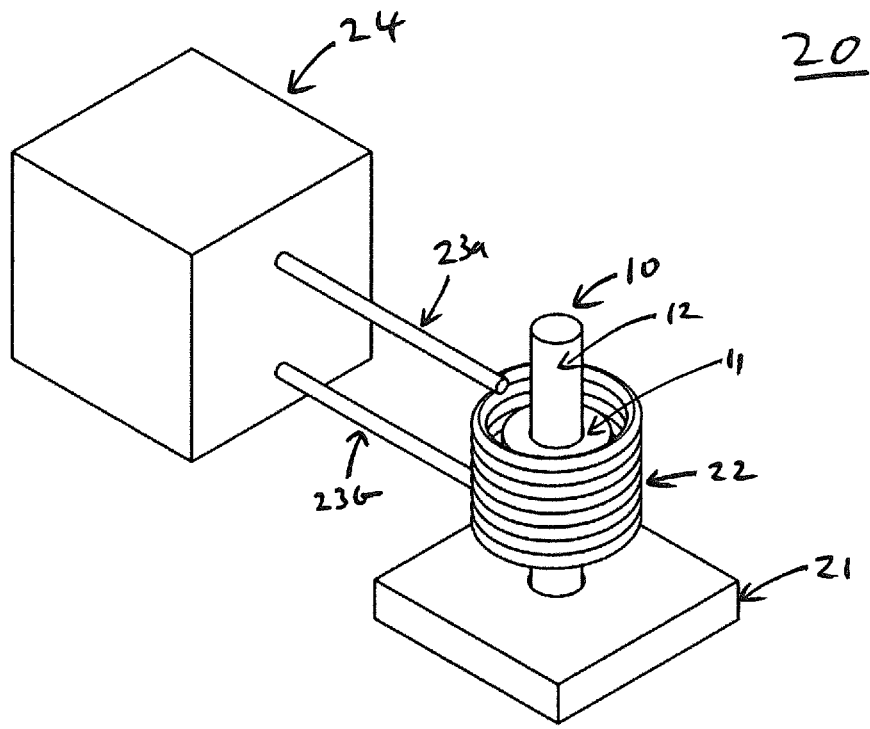
FIG. 6 shows an external view of an apparatus for manufacturing a magnetic rotor unit suitable for implementing the present invention.

An apparatus suitable for providing induction heating to a shaft to which a magnetic rotor body is assembled is shown in FIG. 6.

In FIG. 6, an assembled magnetic rotor unit (10), for example the magnetic rotor unit described above and shown in the associated drawings, is arranged in induction heating apparatus (20). In particular, rotor unit (10) is supported by base (21) having a hole into which shaft (12) is inserted. Magnetic rotor body (11) is supported, for example, by a non-conductive bush, for example a plastic cylindrical bush also having a through-hole, which is friction fitted to shaft (12). Such a bush supports magnetic rotor body (11) against the action of gravity.

In an alternative configuration, base (21) could be provided with a support, such as a cylindrical support, extending from base (21) to surround shaft (12) and to support directly the underside of rotor body (11). In another alternative configuration, shaft (12) could be supported having its axis arranged horizontally.

Importantly, shaft (12) and rotor body (11) need only be supported so that shaft (12) and rotor body (11) are retained in a consistent mutual relationship. This may be alternatively achieved by holding shaft (11), holding rotor body (11), or holding both, for example with one or more appropriate jigs or clamps.

In this apparatus, magnetic rotor unit (10) is arranged so that the central portion (12A) (see FIG. 3) of shaft (12), on which the magnetic rotor body (11) is positioned, lies within the coil (22) of induction heating unit (20). Coil (22) is connected by drive conductors (23A) and (23B) to alternating current supply (24), which provides an alternating current along conductors (23) and (23B) so as to energise induction coil (22). The number of turns on induction coil (22) is not limited, and can vary between, for example, two and twelve, with no practical upper limit depending on the dimensions of magnetic rotor body (11) to be bonded to shaft (12). Advantageously, the number of turns of induction coil (22) and the pitch of induction coil (22) is such that the coil extends so as to entirely surround rotor body (11) along its full length.

Coil (22) may be provided with an insulating sheath (not shown) to isolate the conductor turns of the coil from each other and the local environment.

Preferably, at least partial axial alignment, further preferably full axial alignment, is provided between the axis of the shaft and the axis of the coil.

Figure 7:
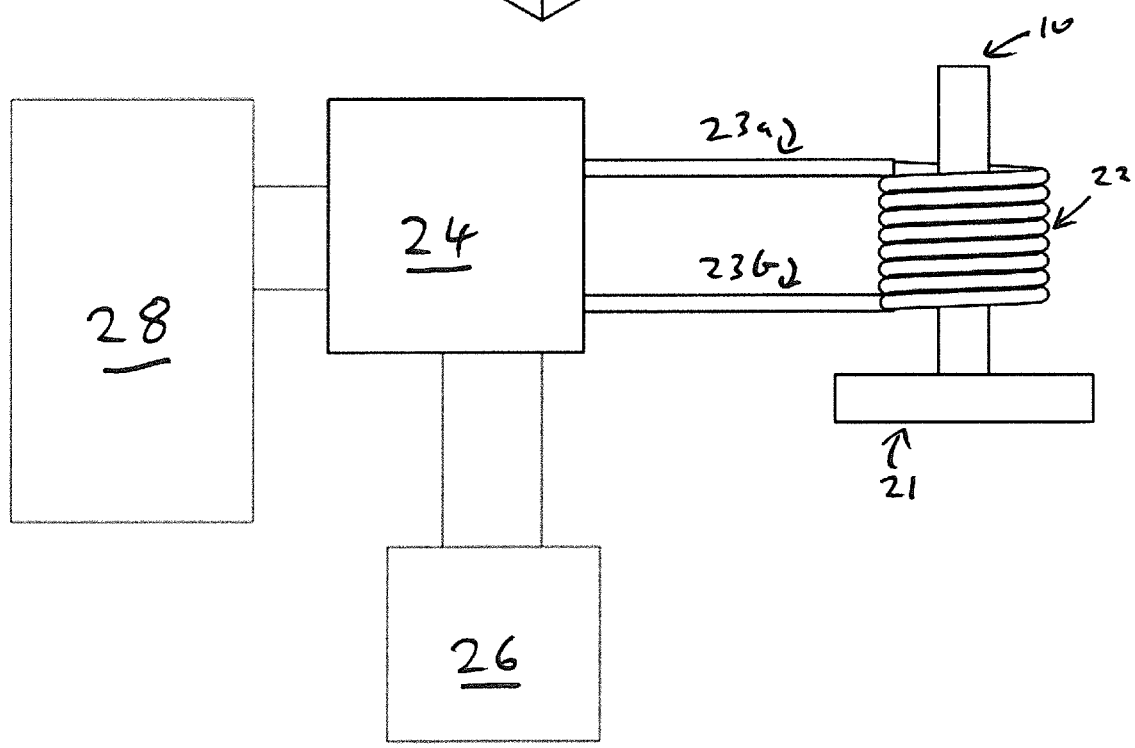
FIG. 7 shows a schematic diagram of the apparatus of FIG. 6 including power supply and control.
Figure 8:
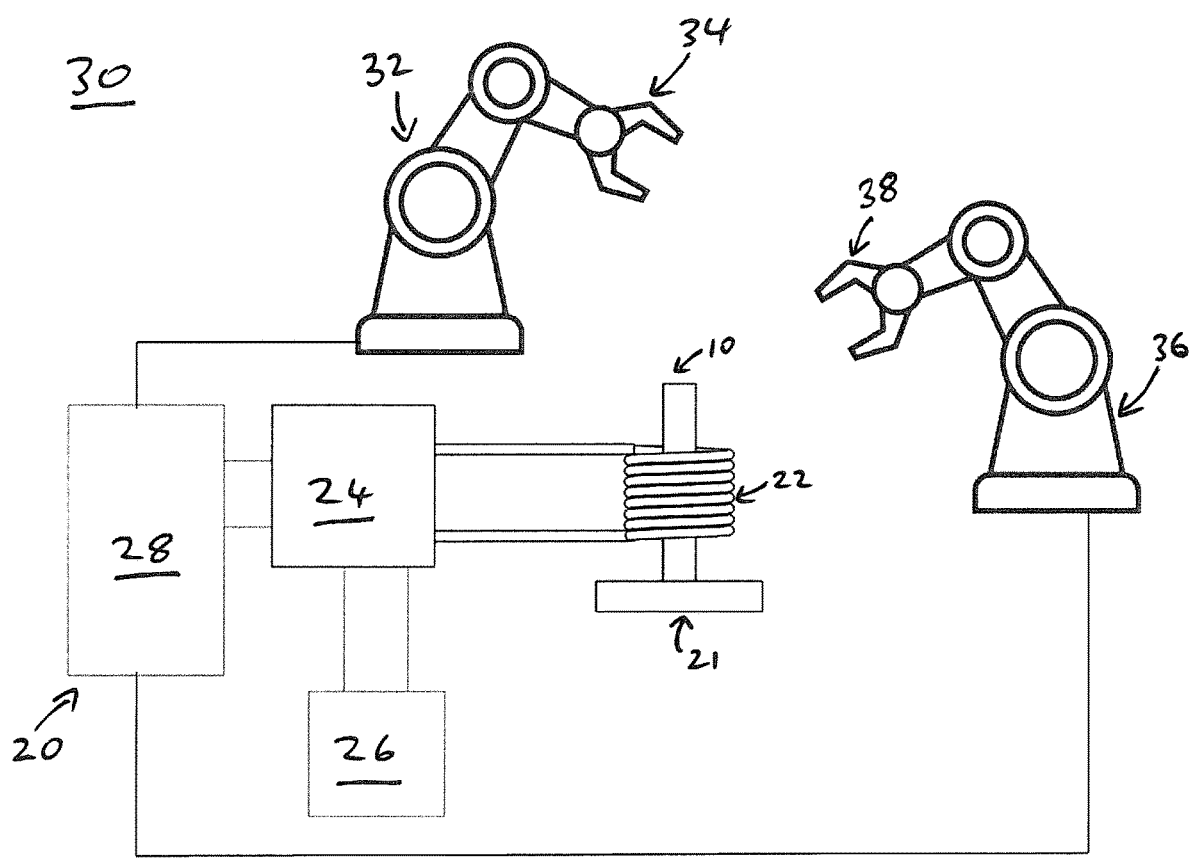
FIG. 8 shows an external view of an apparatus for automated manufacturing of a magnetic rotor unit.

As is shown in the schematic (block) diagram of FIG. 7, alternating current supply (24) is connected to power supply (26), which may be a utility power supply such as a mains supply or a generator, and is controlled by controller (28). Controller (28), which may for example be a programmable logic controller (PLC), is arranged to cause alternating current supply (24) to drive coil (22) with alternating current of predetermined magnitude and frequency.

By energising the coil (22), an alternating electrical magnetic field is induced along the axis of the induction coil, which in turn induces circulating eddy currents in shaft (12). These eddy currents also are localised to a skin depth delta adjacent to the outer surface (12A) of the conductor due to incomplete penetration of the magnetic fields into the interior of shaft (12). Accordingly, rapid heating of the inner surface (11A) of rotor body (11) can be achieved by this method. Advantageously, the coil (22) can be cooled by a cooling liquid circulating in a jacket surrounding the coil, permitting repeated operation without heating the coil to the point of damage.

Figure 9:
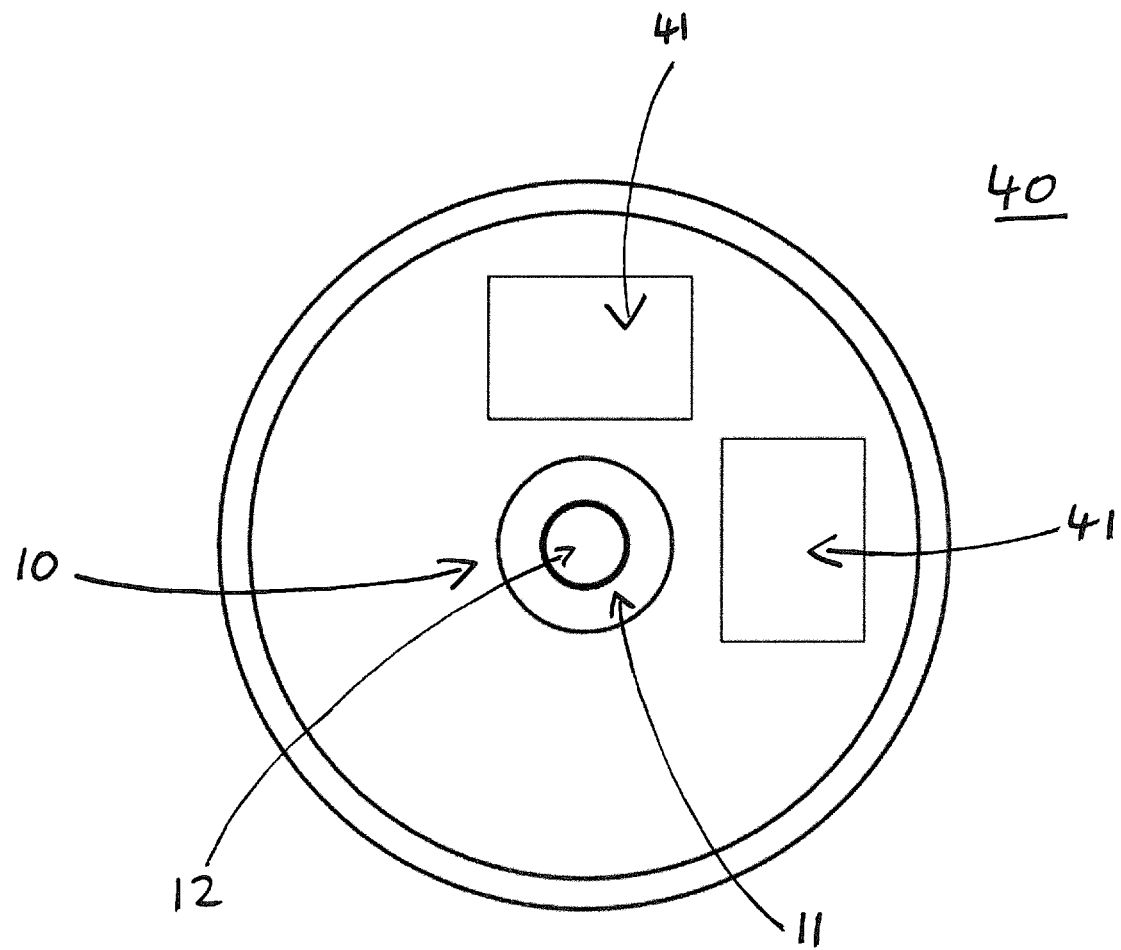
FIG. 9 shows an external view of a rotational sensor unit in which the use of a rotor unit according to the present invention may provide advantages.

In a production situation, automated assembly of magnetic rotor units may be desired by an automated assembly apparatus (30) including induction heating apparatus (20), as shown in FIG. 9. Here, induction heating apparatus (20) is represented by coil (22) and base (21) as well as current supply (24) and power supply (24). In the automated assembly apparatus, controller (28) is connected to first robot arm (32) and second robot arm (36), thereby to control the posture of each robot arm (32, 36). First robot arm (32) is equipped with grasping part (34), while second robot arm (36) is equipped with second grasping part (38). The grasping parts can, for example, be hydraulic clamps.

In operation, controller (28) causes first robot arm (32) with grasping part (32) to pick a shaft (12) from a first pick bin (not shown). Controller (28) then causes first robot arm (32) to place shaft (12) into the hole in base (21). Controller (28) then causes second robot arm (36) to pick a rotor body (11) from a second pick bin (not shown). Controller (28) then causes second robot arm (36) to place rotor body (11) onto shaft (12), so that rotor body (11) arranged on shaft (12) lies within coil (22). Controller (28) then causes current supply (24) to drive coil (22) with alternating current of predetermined magnitude and frequency for a predetermined time so as to bond rotor body (11) onto shaft (12). Controller (28) then causes first robot arm (32) to pick the assembled rotor unit (10) and convey it onward for further processing.

As an alternative to the use of robot arms, such other moving elements such as conveyors, elevators and translators and the like can be provided to pick and assemble the parts and to convey the finished product for further processing. One alternative configuration uses a static coil (22) horizontally oriented through which a nonconductive and nonmagnetic conveyor belt runs, on which a succession of coil units (10) in assembled state sequentially pass. As each unit passes through the coil, the coil is energized to effect the bonding between magnetic rotor body and shaft. The conveyor can then enter further processing regions in which further processing can be effected as described above.

After the resin layer (14) as a bonding layer is provided between shaft (12) and rotor body (12), further processing of the assembled rotor unit (10) may be performed.

Such further processing can constitute, for example, cooling shaft (12). Cooling of shaft (12) can be achieved simply by supporting rotor unit (10) in an ambient environment for a period of time so as to allow shaft (12) to cool, or can be achieved by active means, such as placing rotor unit (10) in a chiller chamber maintained at a predetermined cooling temperature, blowing cold gas at a predetermined cooling temperature onto rotor unit (10), or applying a cold finger maintained at a predetermined cooling temperature onto shaft (12).

Such further processing may also include curing the rotor body (11) by elevating it to a predetermined curing temperature. Such curing can be carried out by placing the assembled rotor unit in an oven maintained at the predetermined curing temperature for a predetermined amount of time.

Rotor unit (10) can be incorporated into a device such as rotational sensor (40) shown in FIG. 9. Sensor (40) has one or more sense elements (41) arranged adjacent rotor body (11) arranged to sense the electromagnetic field generated by rotor body (11). As rotor unit (41) rotates about the axis of shaft (12), a varying magnetic field arises at each of sense elements (41). Shaft (12) may be supported by bearings (not shown).

Sense elements (41) are arranged so as to provide a signal based on the applied magnetic field. For example, if the sense elements are, for example, Hall effect sensors or reed switches, then the signals provided will be based on the magnitude of the magnetic field at the sensors. Such a configuration may be useful as a rotary encoder for measuring rotational position of the shaft. In contrast, if sense elements (41) are, for example, sense coils, then the signals provided will be based on the rate of change of the magnetic field at the sense elements. Such a configuration may be useful as a speed sensor for measuring the rotational speed of the shaft.

One or more such sense element (41) may be provided. Where more than one sense element (41) is provided, sense elements (41) may be of the same type or different types. If more than one sense element (41) is provided, it may be possible to determine the direction of rotation of shaft (12) by comparing the signals provided by each sensor, for example by comparing the phases of the signals provided by each sense element (41).

By applying the inventive rotor unit (10) disclosed herein, sense elements (41) may be placed closer to the rotor, leading to improved sensing accuracy and compactness. Also, by applying the inventive rotor unit (10) disclosed herein, the symmetry of the rotor unit (10) may be improved, leading to reduced vibration at high shaft speeds and a reduction of wear in the bearings supporting shaft (12).

The above explanation has been given with reference to a rotor body (11) which is cylindrical in overall shape, with a cylindrical hole (11A) having an axis aligned with the axis of the cylindrical body so as to be concentric therewith. However, embodiments with reduced symmetry may be useful in certain applications. Accordingly, the shape of each of the hole (11A) and rotor body is not particularly limited. For example each of the hole (11A) and the rotor body (11) may for example be prismatic, such as polygonal prismatic or elliptical prismatic. The cross-sections of the hole (11A) and the shaft (11A) may be spline-shaped. Moreover, the hole (11A) and the shaft (12) may each be tapered or profiled to effect a close fit between hole and shaft.

Also, although a through-hole or bore has been explained as the hole (11A) of the rotor body (11), a blind hole or recess which does not penetrate the whole way through rotor body (11A) can equivalently be provided, for example if the shaft is to be supported only on one side of the rotor.

The above explanation has been given principally in connection with application to a rotor unit for a sensor, for example a speed sensor or a rotary encoder. However, the advantages of the present invention are not limited to such applications, and may be attained in other devices in which a magnetic rotor unit is incorporated. For example, such rotor units may without limitation be used in other types of sensors, in electromagnetic generators, in pulse generators, in motors, in magnetic brakes and in magnetic couplings.

Naturally, those skilled in the art would be able to adapt the present disclosure to a variety of situations without undue experimentation, to achieve a solution which fits their own particular engineering requirements, using such materials and techniques as may be available in the art.

Accordingly, the above-described embodiments should not be seen as limiting the present invention, but are to be regarded merely as exemplary. The scope of the present invention is accordingly defined by the appended claims.

The invention claimed is:

1. A method of manufacturing a magnetic rotor unit, the method comprising:
   providing a composite magnetic rotor body comprising magnetic particles dispersed in a polymer resin and having a hole formed therein;
   inserting a shaft into the hole, an outer diameter of the shaft corresponding to an inner diameter of the hole; and,
   heating the shaft,
   wherein the heating is performed in a relatively cool environment so as to induce a temperature gradient across the rotor body radially outward of the shaft.

2. The method of claim 1, wherein heating the shaft comprises causing a current to flow in the shaft.

3. The method of claim 2, wherein the current is alternating current.

4. The method of claim 2, wherein the current is caused to flow by electromagnetic induction.

5. The method of claim 2, wherein the current is caused to flow by placing at least a portion of the shaft which is inserted into the hole in a state of at least partial axial alignment with an induction coil and causing a current to flow in the induction coil.

6. The method of claim 1, wherein the heating is such that an outer surface of the shaft adjacent to the inner diameter of the hole reaches a temperature corresponding to a temperature at which the polymer resin exudes from the magnetic rotor body to contact the outer surface of the shaft, thereby to form a bonding layer of resin.

7. The method of claim 6, wherein the heating is such as to cause the outer surface of the shaft to heat at a faster rate than a radially inner portion of the shaft.

8. The method of claim 1, wherein the rotor body is a green body comprising uncured resin.

9. The method of claim 8, further comprising a step of, after heating the shaft, cooling the shaft.

10. The method of claim 1, wherein the hole is a through-hole.

11. The method of claim 1, wherein a clearance between the shaft and the hole is less than 200 micrometers.

12. The method of claim 1, wherein the shaft is made of a metallic material.

13. The method of claim 1, wherein the rotor body has rotational symmetry about an axis, and wherein the shaft is aligned with the axis of rotational symmetry.

14. The method of claim 1, wherein the rotor body is cylindrical.

15. The method of claim 1, wherein the shaft is cylindrical.

16. The method of claim 1, wherein the shaft is one of an electrically conductive and semi-conductive material.

17. The method of claim 1, wherein the magnetic particles comprise at least one of ferrite, a rare earth iron boride, and samarium iron nitride.

18. The method of claim 1, wherein the resin comprises a thermoset polymer.

19. The method of claim 1, wherein the rotor body is a compacted composite body.

20. The method of claim 1, further comprising a step of, after heating the shaft, curing the resin of the rotor body by heating the rotor body to a curing temperature for curing time period so as to thermally cure the resin.

21. The method of claim 1, wherein the polymer resin of the rotor body is greater than 1% by weight and less than 5% by weight, of the rotor.

* * * * *